(12) United States Patent
Arakawa

(10) Patent No.: US 11,647,139 B2
(45) Date of Patent: May 9, 2023

(54) IMAGE PROCESSING APPARATUS, IMAGE PROCESSING SYSTEM, CONTROL METHOD THEREOF, AND STORAGE MEDIUM

(71) Applicant: CANON KABUSHIKI KAISHA, Tokyo (JP)

(72) Inventor: Junya Arakawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/544,723

(22) Filed: Dec. 7, 2021

(65) Prior Publication Data

US 2022/0201141 A1 Jun. 23, 2022

(30) Foreign Application Priority Data

Dec. 23, 2020 (JP) .............................. JP2020-214215

(51) Int. Cl.
*G06F 15/00* (2006.01)
*H04N 1/00* (2006.01)
*G06F 16/16* (2019.01)

(52) U.S. Cl.
CPC ....... *H04N 1/00766* (2013.01); *G06F 16/164* (2019.01); *H04N 1/00214* (2013.01); *H04N 1/00331* (2013.01); *H04N 1/00782* (2013.01); *H04N 2201/3229* (2013.01)

(58) Field of Classification Search
CPC ........... H04N 1/00766; H04N 1/00214; H04N 1/00331; H04N 1/00782; H04N 2201/3229
USPC ....................................................... 358/1.15
See application file for complete search history.

(56) References Cited

U.S. PATENT DOCUMENTS

| 6,104,500 A  | * | 8/2000  | Alam ................. H04N 1/32411 |
|              |   |         |                           382/229 |
| 8,320,019 B2 |   | 11/2012 | Namikata et al. ............. 358/2.1 |
| 10,817,559 B2|   | 10/2020 | Arakawa ............... G06F 16/583 |
| 11,042,733 B2|   | 6/2021  | Kitamura ........... G06K 9/00449 |

FOREIGN PATENT DOCUMENTS

JP       2020-046819       3/2020

OTHER PUBLICATIONS

U.S. Appl. No. 17/710,784, filed Mar. 31, 2022.

* cited by examiner

*Primary Examiner* — Mark R Milia
(74) *Attorney, Agent, or Firm* — Venable LLP

(57) ABSTRACT

An image processing apparatus according to the present disclosure is an image processing apparatus for automatically transmitting a document file by using a result of a character recognition process on a scan image of a document as a property, and includes: at least one processor that executes the program to perform: extracting a confidence factor indicating a degree of certainty of the result of the character recognition process; in a case where the extracted confidence factor is above a predetermined threshold value, determining that the document file using the result of the character recognition process as the property is allowed to be automatically transmitted; and setting the predetermined threshold value such that an incorrect transmission ratio of document files to be automatically transmitted reaches a target incorrect transmission ratio.

17 Claims, 12 Drawing Sheets

FIG.6A

Scanned Form List — 600

[Send] 602  [Edit] 603  [Delete] 604

| Form ID 605 | Transmission Destination 606 | Status 607 | File Name 608 |
|---|---|---|---|
| 001 | Storage Server A | Unlearned | |
| 002 | Storage Server A | Unlearned | |
| 003 | Storage Server B /20200610/ | Learned | Quotation_Shimomaruko-Corporation |
| 004 | Storage Server A | Unlearned | |
| 005 | Storage Server B /20200615/ | Learned | Quotation_Shimomaruko-Corporation |

Edit Screen — 610

[Cancel] 612  [Finish Editing] 613

P2 [Quotation]  F2 [INV20201234] 619
F1
618

[Product C: ¥6000]
[Product D: ¥7000]
[Product E: ¥8000]

[¥21000]

Folder Name 614
[20200604_Quotation]

File Name 615
[Quotation_INV20201234]

[Date] 616   [User Id] 617

611

```
{
  "enabledAutoTransmission": true,
  "confidence":0.9,
  "matched": true,
  "formId": "aaaaaaaa-ffff-49ab-acf8-55558888eeee",
  "matchingScore": 0.745,
  "rectInfoArray": [
    {
      "key": "textRegion0",
      "score": 0..95,
      "region": {
        "rect": {
          "x": 50,
          "y": 550,
          "width":120,
          "height":60,
        },
        "text": " quotation "
      }
    },
    {
      "key": "textRegion1",
      "score": 0.90,
      "region": {
        "rect": {
          "x": 240,
          "y":550,
          "width":200,
          "height": 60,
        },
        "text": "INV20201234"
      }
    }
  ],
  "metadataArray": [
    {
      "key": "name1",
      "keyType": "filename",
      "value": [
        "textRegion1"
      ]
    },
    {
      "key": "name2",
      "keyType": "foldername",
      "value": [
        "$date",
        "separator",
        "textRegion0"
      ]
    }
  ]
  "ocrResultArray": [
    {
      "rect": {
        "x": 80,
        "y":430,
        "width":270,
        "height": 60,
      },
      "text": " product C:6000 "
    },
          .
          .
          .
        omission
  ]
}
```

| A ≤ OVERALL CONFIDENCE FACTOR < B | | NUMBER OF SCAN IMAGES | | | | IN-RANGE INCORRECT TRANSMISSION RATIO |
|---|---|---|---|---|---|---|
| VALUE A | VALUE B | CORRECT | INCORRECT | NUMBER OF AUTOMATICALLY TRANSMITTED SCAN IMAGES | NUMBER OF SCAN IMAGES | |
| 0 | 0.1 | 1 | 20 | 0 | 21 | 95.24% |
| 0.1 | 0.2 | 10 | 10 | 0 | 20 | 50.00% |
| 0.2 | 0.3 | 20 | 6 | 0 | 26 | 23.08% |
| 0.3 | 0.4 | 40 | 5 | 0 | 45 | 11.11% |
| 0.4 | 0.5 | 60 | 4 | 0 | 64 | 6.25% |
| 0.5 | 0.6 | 80 | 3 | 0 | 83 | 3.61% |
| 0.6 | 0.7 | 100 | 2 | 0 | 102 | 1.96% |
| 0.7 | 0.8 | NO DATA | | 150 | 150 | NO DATA |
| 0.8 | 0.9 | | | 200 | 200 | |
| 0.9 | 1 | | | 150 | 150 | |
| 1 | 1 | | | 100 | 100 | |

| A ≤ OVERALL CONFIDENCE FACTOR < B | | REPRESENTATIVE THRESHOLD VALUE | IN-RANGE INCORRECT TRANSMISSION RATIO | |
|---|---|---|---|---|
| VALUE A | VALUE B | | ACTUALLY MEASURED VALUE | EXTRAPOLATED VALUE |
| 0 | 0.1 | 0.05 | 95.24% | |
| 0.1 | 0.2 | 0.15 | 50.00% | |
| 0.2 | 0.3 | 0.25 | 23.08% | |
| 0.3 | 0.4 | 0.35 | 11.11% | |
| 0.4 | 0.5 | 0.45 | 6.25% | |
| 0.5 | 0.6 | 0.55 | 3.61% | |
| 0.6 | 0.7 | 0.65 | 1.96% | |
| 0.7 | 0.8 | 0.75 | | 0.94% |
| 0.8 | 0.9 | 0.85 | | 0.49% |
| 0.9 | 1 | 0.95 | | 0.26% |
| 1 | 1 | 1 | | 0.19% |

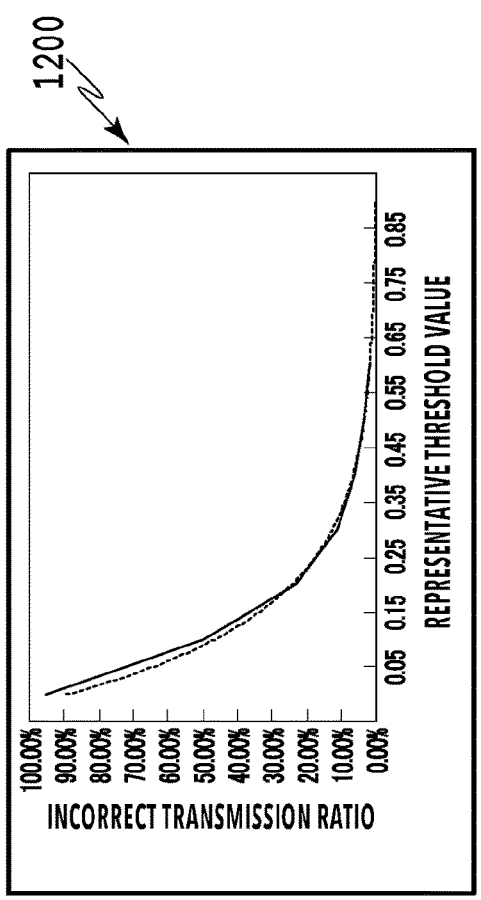

FIG.10C

| A ≤ OVERALL CONFIDENCE FACTOR < B | | NUMBER OF SCAN IMAGES | IN-RANGE INCORRECT TRANSMISSION RATIO | NUMBER OF INCORRECTLY TRANSMITTED SCAN IMAGES | ACCUMULATED NUMBER OF INCORRECTLY TRANSMITTED SCAN IMAGES WITH VALUE A AND ABOVE | ACCUMULATED NUMBER OF SCAN IMAGES WITH VALUE A AND ABOVE | INCORRECT TRANSMISSION RATIO WITH VALUE A |
|---|---|---|---|---|---|---|---|
| VALUE A | VALUE B | | | | | | |
| 0 | 0.1 | 21 | 95.24% | 20.00 | FALSE | 961 | 0.00% |
| 0.1 | 0.2 | 20 | 50.00% | 10.00 | 32.97 | 940 | 3.51% |
| 0.2 | 0.3 | 26 | 23.08% | 6.00 | 22.97 | 920 | 2.50% |
| 0.3 | 0.4 | 45 | 11.11% | 5.00 | 16.97 | 894 | 1.90% |
| 0.4 | 0.5 | 64 | 6.25% | 4.00 | 11.97 | 849 | 1.41% |
| 0.5 | 0.6 | 83 | 3.61% | 3.00 | 7.97 | 785 | 1.02% |
| 0.6 | 0.7 | 102 | 1.96% | 2.00 | 4.97 | 702 | 0.71% |
| 0.7 | 0.8 | 150 | 0.94% | 1.42 | 2.97 | 600 | 0.50% |
| 0.8 | 0.9 | 200 | 0.49% | 0.99 | 1.56 | 450 | 0.35% |
| 0.9 | 1 | 150 | 0.26% | 0.39 | 0.57 | 250 | 0.23% |
| 1 | 1 | 100 | 0.19% | 0.19 | 0.19 | 100 | 0.19% |

FIG.10D

IMAGE PROCESSING APPARATUS, IMAGE PROCESSING SYSTEM, CONTROL METHOD THEREOF, AND STORAGE MEDIUM

BACKGROUND OF THE INVENTION

Field of the Invention

The technique of the present disclosure relates to a technique for setting a property of a document file.

Description of the Related Art

A method of computerizing a paper document by scanning it has heretofore been widely employed as a document management method. Moreover, in the computerization of the document, a character recognition process is performed on the scan image being the image obtained by the scan, and the recognized characters are used as a property such as a file name. Doing so also involves referring to a confidence factor as an index indicating the degree of certainty of the recognized characters to determine whether to employ them as the property and whether to allow automatic transmission of the document file, and the like. In this regard, Japanese Patent Laid-Open No. 2020-46819 discloses a technique (hereinafter referred to as "conventional technique") in which the result of a character recognition process on a processing-target image (first image) is, depending on its confidence factor, compared with the result of character recognition on a reference image (second image), and a warning is output in a case where the results do not match each other.

Here, consider a case of using the above confidence factor to determine whether to allow automatic transmission of a document file. In this case, a document file automatically transmitted has been transmitted to an external storage. It is therefore necessary to access the external storage in order to know whether there is an error in the character strings used as the folder name and the file name of the automatically transmitted document file. In the automatic transmission, it is important to hold the incorrect transmission ratio of scan images below a certain level (i.e., to achieve an optimal success ratio of automatic transmission). For that purpose, it is necessary to correctly estimate the degree of reliability of the confidence factor. However, the conventional technique assumes the presence of the reference image in addition to the processing-target image (i.e., the presence of a relevant document). Moreover, it is impossible to estimate the degree of reliability directly with the confidence factor.

The technique of the present disclosure has been made in view of the above problem, and an object thereof is to make it possible to flexibly set an appropriate degree of reliability of a confidence factor to be used to determine whether to allow automatic transmission of a document file.

SUMMARY OF THE INVENTION

An image processing apparatus according to the present disclosure is an image processing apparatus for automatically transmitting a document file by using a result of a character recognition process on a scan image of a document as a property, the apparatus comprising: at least one memory that stores a program; and at least one processor that executes the program to perform: extracting a confidence factor indicating a degree of certainty of the result of the character recognition process; determining, in a case where the extracted confidence factor is above a predetermined threshold value, that the document file using the result of the character recognition process as the property is allowed to be automatically transmitted; and setting the predetermined threshold value such that an incorrect transmission ratio of document files to be automatically transmitted reaches a target incorrect transmission ratio.

Further features of the present disclosure will become apparent from the following description of exemplary embodiments with reference to the attached drawings.

BRIEF DESCRIPTION OF THE DRAWINGS

FIG. 5 is a diagram showing the relationship of FIGS. 5A and 5B;

FIGS. 6A and 6B are diagrams illustrating an example of a scanned form list screen and an edit screen to be displayed by the MFP or the client PC;

FIG. 7 is a diagram illustrating an example of the data structure of an analysis result generated by an image processing unit in the system;

FIGS. 10A to 10D are diagrams illustrating an example of a method of estimating an incorrect transmission ratio in First Embodiment.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

System Configuration

Figure 1:
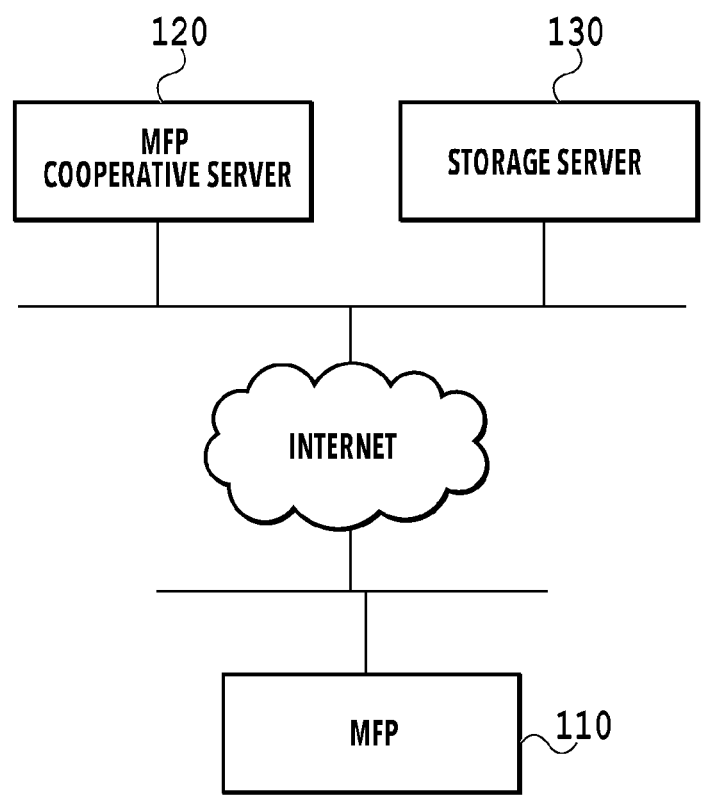
FIG. 1 is a diagram illustrating an entire configuration of a system of the present disclosure.

FIG. 1 is a diagram illustrating an entire configuration of an image processing system according to the present embodiment. The image processing system includes a multifunction peripheral (MFP) 110, and server apparatuses 120 and 130 that provide cloud services over the Internet. The MFP 110 is communicatively connected to the server apparatuses 120 and 130 via the Internet.

The MFP 110 is an example of an information processing apparatus having a scan function. The MFP 110 is a multifunction peripheral having a plurality of functions such as a print function and a BOX save function in addition to the scan function. Both of the server apparatuses 120 and 130 are an example of an information processing apparatus that provides a cloud service. The server apparatus 120 in the present embodiment provides a cloud service that performs an image analysis on scan images received from the MFP 110 and transfers a request from the MFP 110 to the server apparatus 130 providing another service. Hereinafter, the cloud service provided by the server apparatus 120 will be referred to as "MFP cooperative service". The server apparatus 130 provides a cloud service that saves files sent thereto via the Internet and provides a saved file in response to a request from a web browser on a client PC (not illustrated) or the like (hereinafter referred to as "storage service"). In the present embodiment, the server apparatus 120, which provides the MFP cooperative service, will be referred to as "MFP cooperative server", and the server apparatus 130, which provides the storage service, will be referred to as "storage server".

The configuration of the image processing system illustrated in FIG. 1 is an example, and the configuration is not limited to this. For example, the MFP 110 may also have the function of the MFP cooperative server 120. Also, the MFP cooperative server 120 may be connected to the MFP 110 not via the Internet but via a local area network (LAN). Also, the storage server 130 may be replaced with a mail server that implements a mail distribution service, and used in a situation of attaching a scan image of a document to mail and transmitting it.

Hardware Configuration of MFP

Figure 2:
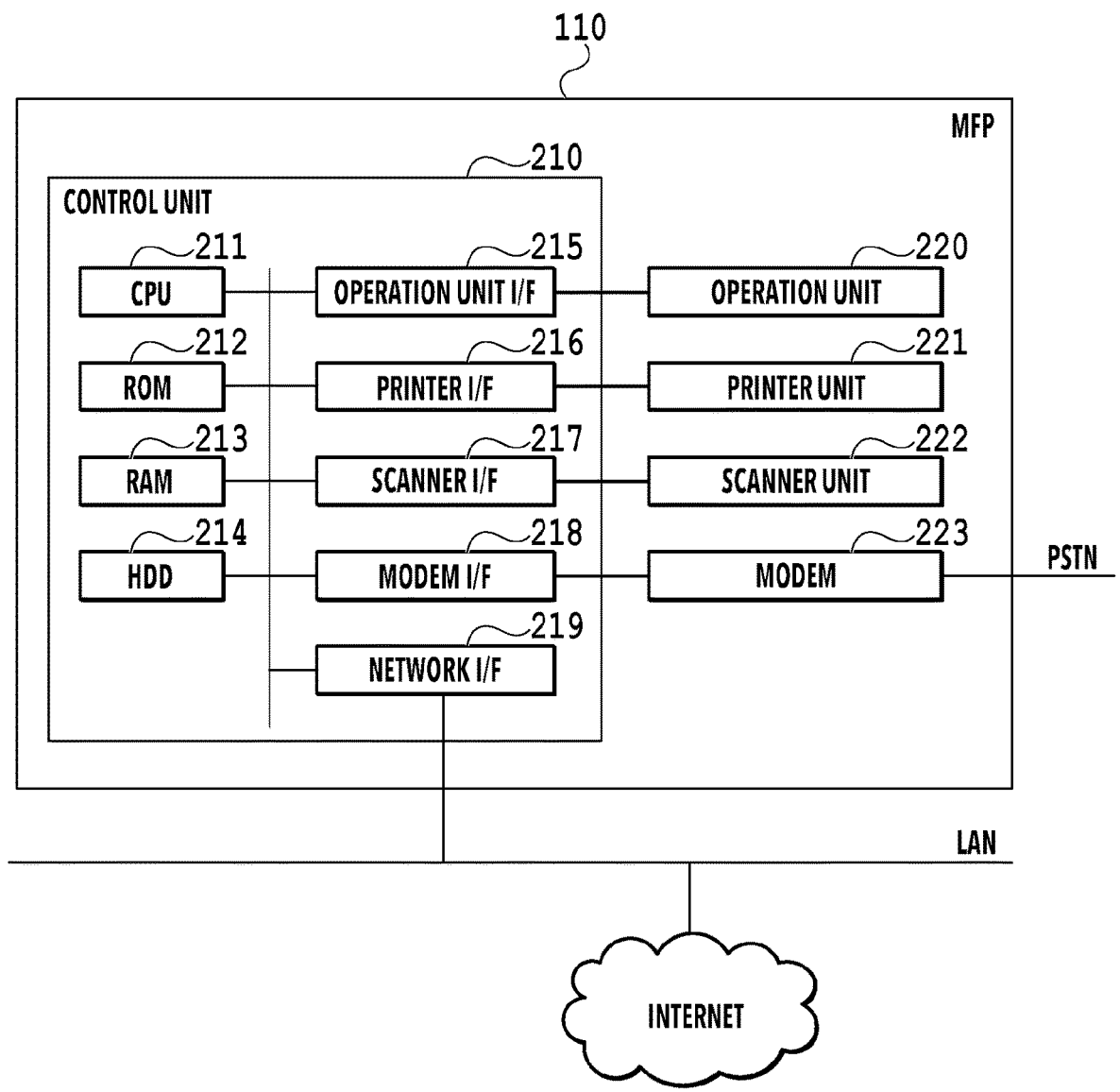
FIG. 2 is a hardware configuration diagram of an MFP.

FIG. 2 is a block diagram illustrating a hardware configuration of the MFP 110. The MFP 110 includes a control unit 210, an operation unit 220, a printer unit 221, a scanner unit 222, and a modem 223.

The control unit 210 includes components 211 to 219 below and controls the operation of the entire MFP 110. The CPU 211 reads out and executes various control programs stored in the ROM 212 (programs corresponding to the various functions illustrated in the software configuration diagram to be mentioned later). The RAM 213 is used as temporary storage areas such as a main memory and a work area for the CPU 211. Note that in the present embodiment, a single CPU 211 uses a single memory (RAM 213 or HDD 214) to execute the processes illustrated in the flowcharts to be mentioned later. However, the configuration is not limited to this. For example, a plurality of CPUs and a plurality of RAMs or HDDs may be caused to cooperate with each other to execute the processes. The HDD 214 is a large-capacity storage unit that stores image data and various programs. The operation unit I/F 215 is an interface that connects the operation unit 220 and the control unit 210. The operation unit 220 includes a touchscreen, a keyboard, and the like, and accepts user operations, inputs, and instructions. Note that touch operations on the touchscreen include operations with a person's finger and operations with a stylus. The printer I/F 216 is an interface that connects the printer unit 221 and the control unit 210. Image data to be printed is transferred from the control unit 210 to the printer unit 221 via the printer I/F 216, and printed onto a print medium such as paper. The scanner I/F 217 is an interface that connects the scanner unit 222 and the control unit 210. The scanner unit 222 generates scan image data by optically reading a document set on platen glass or auto document feeder (ADF) not illustrated, and inputs the scan image data to the control unit 210 via the scanner I/F 217. The scan image data generated by the scanner unit 222 can be printed (copied and outputted) by the printer unit 221, saved to the HDD 214, or transmitted in the form of a file to an external apparatus such as the MFP cooperative server 120 via a LAN. The modem I/F 218 is an interface that connects the modem 223 and the control unit 210. The modem 223 performs facsimile communication of image data with a facsimile (not illustrated) on a PSTN. The network I/F 219 is an interface that connects the control unit 210 (MFP 110) to a LAN. The MFP 110 transmits scan image data to the MFP cooperative server 120 or receives various pieces of data from the MFP cooperative server 120 by using the network I/F 219.

The hardware configuration of the MFP 110 described above is an example and may include another configuration(s) or omit part of the configuration as necessary.

Hardware Configurations of Server Apparatuses

Figure 3:
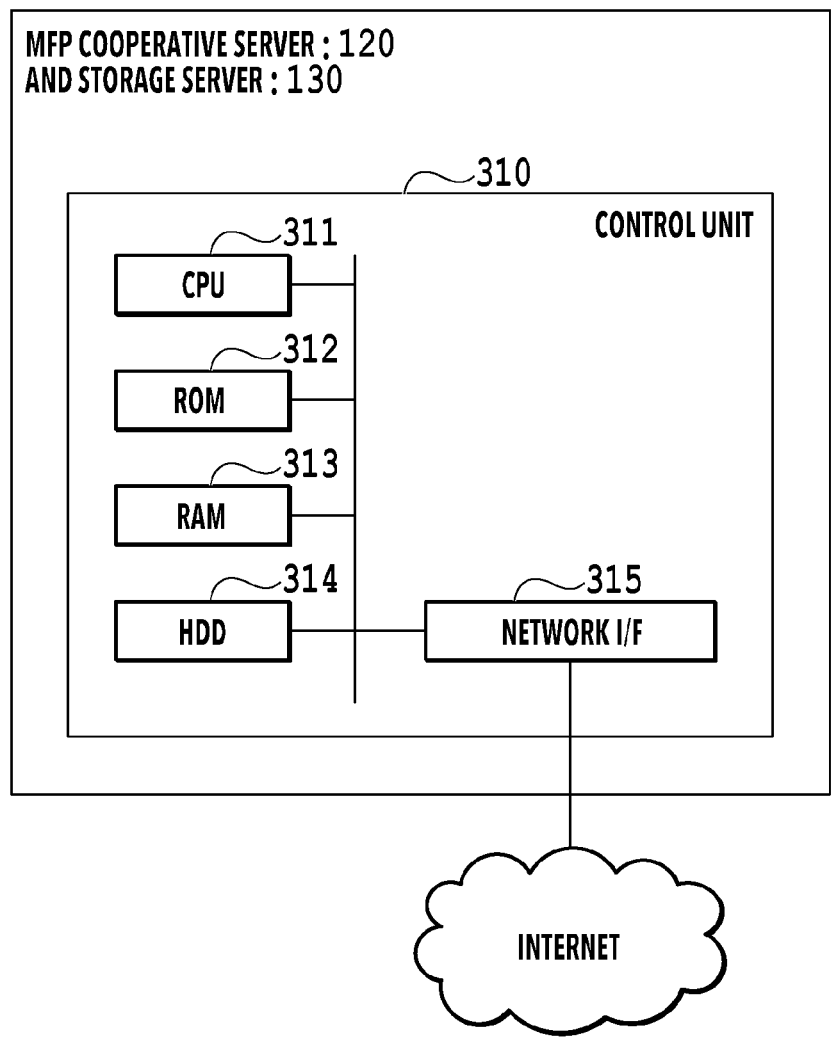
FIG. 3 is a hardware configuration diagram of a client PC and a MFP cooperative server.

FIG. 3 is a block diagram illustrating hardware configurations of the MFP cooperative server 120 and the storage server 130. The MFP cooperative server 120 and the storage server 130 have a common hardware configuration, and include a CPU 311, a ROM 312, a RAM 313, an HDD 314, and a network I/F 315. The CPU 311 reads out a control program stored in the ROM 312 and executes various processes to control the entire operation. The RAM 313 is used as temporary storage areas such as a main memory and a work area for the CPU 311. The HDD 314 is a large-capacity storage unit that stores image data and various programs. The network I/F 315 is an interface that connects the control unit 310 to the Internet. The MFP cooperative server 120 and the storage server 130 receive requests for various processes from other apparatuses (such as the MFP 110) and return process results corresponding to these requests via the network I/F 315.

Software Configuration of Image Processing System

Figure 4:
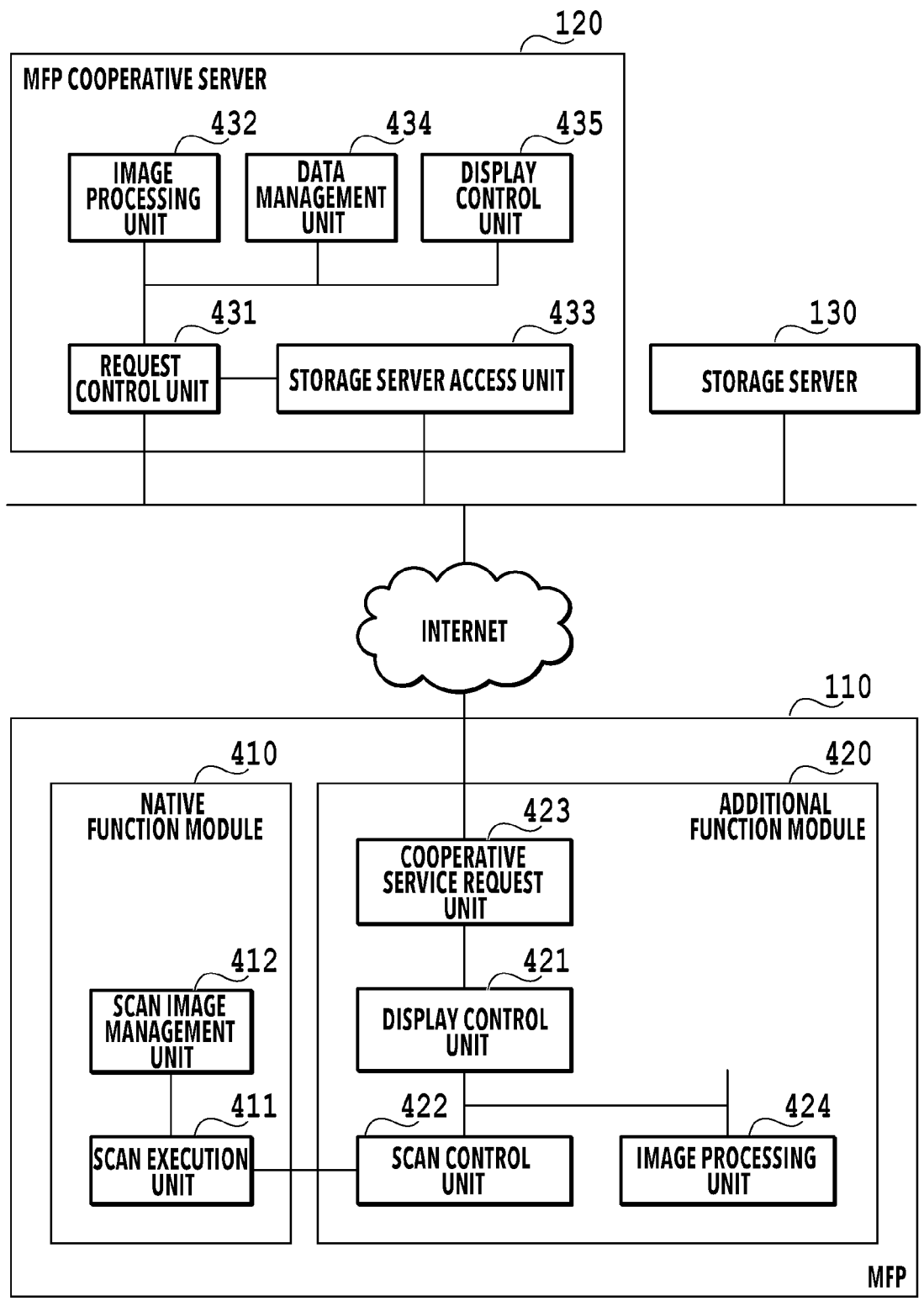
FIG. 4 is a software configuration diagram of the system.

FIG. 4 is a block diagram illustrating a software configuration of the image processing system according to the present embodiment. Software configurations corresponding to the roles of the MFP 110, the MFP cooperative server 120, and storage server 130 forming the image processing system will be described below in turn. Note that the description will focus on, of the various functions of each apparatus, functions related to processes from scanning a document to computerize it (convert it into a file) to saving the computerized document to the storage server 130.

Software Configuration of MFP

The function modules of the MFP 110 are generally classified into two function modules, namely, a native function module 410 and an additional function module 420. The native function module 410 is an application normally included in the MFP 110 whereas the additional function module 420 is an application additionally installed in the MFP 110. The additional function module 420 is an application based on Java (registered trademark), which enables its functions to be easily added to the MFP 110. Note that other additional applications not illustrated may be installed in the MFP 110.

The native function module 410 has a scan execution unit 411 and a scan image management unit 412. The additional function module 420 has a display control unit 421, a scan control unit 422, a cooperative service request unit 423, and an image processing unit 424. The display control unit 421 displays user interface (UI) screens for accepting various user operations on the touchscreen of the operation unit 220. Examples of the various user operations include entering login authentication information for accessing the MFP cooperative server 120, configuring the scan settings, issuing an instruction to start a scan, setting a file name, issuing an instruction to save a file, and so on. In response to an user operation performed on a UI screen (e.g., pressing a "Start scan" button), the scan control unit 422 issues an instruction to execute a scan process to the scan execution unit 411 along with scan setting information. According to the instruction to execute a scan process from the scan control unit 422, the scan execution unit 411 causes the scanner unit 222 to execute a document read operation via the scanner I/F 217 to thereby generate scan image data. The scan image management unit 412 saves the generated scan image data to the HDD 214. At this time, the scan control unit 422 is notified of information of a scan image identifier uniquely indicating the saved scan image data. The scan image identifier is a number, a symbol, alphabetical characters, or the like uniquely identifying the image obtained by a scan by the MFP 110. The scan control unit 422, for example, obtains scan image data to be converted into a file from the scan image management unit 412 by using its scan image identifier mentioned above. Then, the scan control unit 422 instructs the cooperative service request unit 423 to issue a request to the MFP cooperative server 120 for processes necessary for the conversion into a file. The cooperative service request unit 423 issues requests to the MFP cooperative server 120 for various processes, and receives responses to these requests. Examples of the various processes include login authentication, analysis of the scan image, transmission of the scan image data, and so on. A communication protocol such as REST or SOAP is used in the communication with the MFP cooperative server 120. The image processing unit 424 performs predetermined image processing on the scan image data to generate an image to be used in an UI screen to be displayed by the display control unit 421.

Note that an apparatus other than the MFP 110 (such as a client PC not illustrated) may include the above-described additional function module 420 and the like. Specifically, the system configuration may be such that the client PC requests an analysis of a scan image obtained by the MFP 110, sets a file name based on the analysis result, and performs other similar operations.

Software Configurations of Server Apparatuses

First, the software configuration of the MFP cooperative server 120 will be described. The MFP cooperative server 120 has a request control unit 431, an image processing unit 432, a storage server access unit 433, a data management unit 434, and a display control unit 435. The request control unit 431 stands by in a state where it can receive requests from external apparatuses, and instructs the image processing unit 432, the storage server access unit 433, and the data management unit 434 to execute predetermined processes according to the contents of a request received. The image processing unit 432 performs, on scan image data sent from the MFP 110, an image analysis process such as a process of detecting character regions, a character recognition process (OCR process), a similar document determination process, and an automatic transmission determination process and also an image modification process such as turning the scan image data and correcting its tilt. Note that each character region detected from a scan image will be hereinafter referred to as "character region". Also, the following description will be given using a form such as a quotation or an invoice as an example of the target document, and its scan image will be referred to as "form image". The storage server access unit 433 issues a request to the storage server 130 for processes. Cloud services have made various interfaces publicly available which are for saving files to a storage server and obtaining saved files by using a protocol such as REST or SOAP. The storage server access unit 433 issues requests to the storage server 130 by using a publicly available interface. The data management unit 434 generates a document file containing a scan image in response to receiving an instruction from the request control unit 431. In doing so, the data management unit 434 sets a file name based on the result of the character recognition process on the character strings contained in this scan image. The display control unit 435 returns screen layout information (such as HTML and CSS) necessary to display a screen in response to receiving a request from a web browser running on a PC or mobile terminal (neither of which is illustrated) connected via the Internet. Via the screen displayed on the web browser, the user can check registered user information and change the scan settings.

Next, the software configuration of the storage server 130 will be described. The storage server 130 has a request control unit (not illustrated), a file management unit (not illustrated), and a display control unit (not illustrated). The request control unit (not illustrated) stands by in a state where it can receive requests from external apparatuses and, in the present embodiment, instructs the file management unit (not illustrated) to save a received file or read out a saved file in response to a request from the MFP cooperative server 120. The request control unit (not illustrated) then returns a response corresponding to the request to the MFP cooperative server 120. The display control unit (not illustrated) returns screen layout information (such as HTML and CSS) necessary to display a screen in response to receiving a request from a web browser running on a PC or mobile terminal (neither of which is illustrated) connected via the Internet. Via the screen displayed on the web browser, the user can check and obtain saved files.

Entire Flow of Processing

Figure 5A:
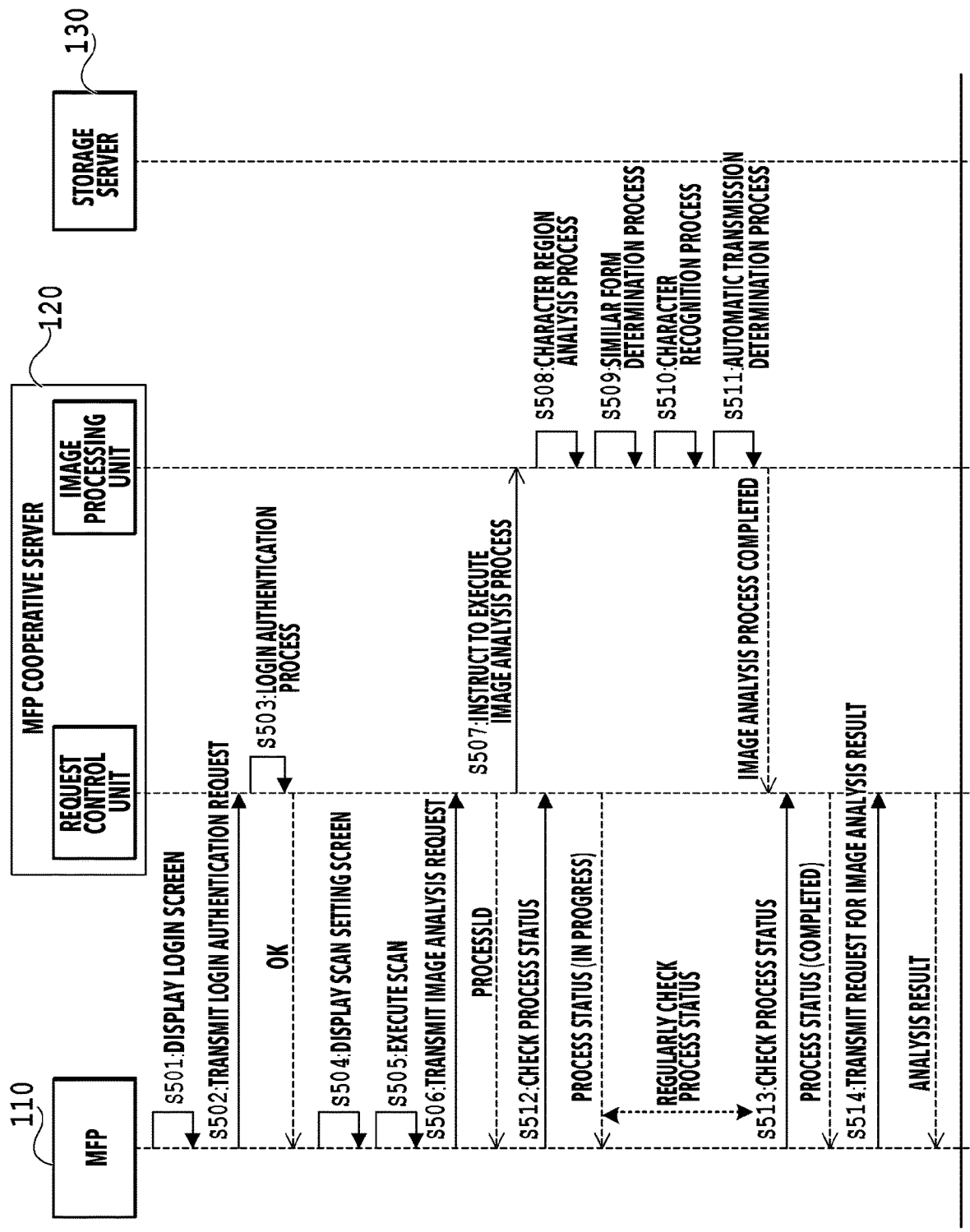
FIGS. 5A and 5B are totally a sequence chart illustrating a flow of processing between apparatuses.
Figure 5B:
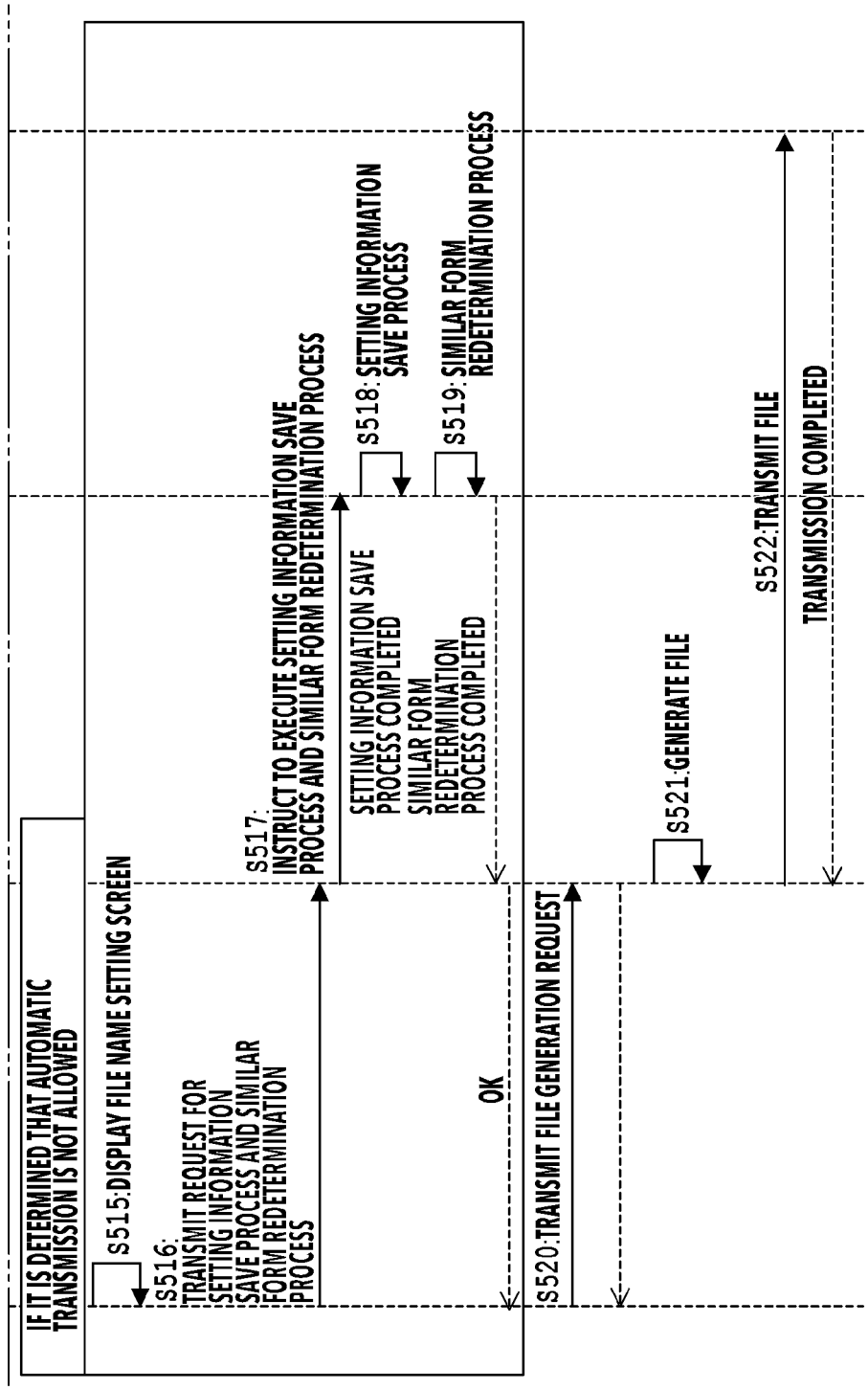

FIGS. 5A and 5B are totally a sequence chart illustrating a flow of processing performed between the apparatuses in a case of scanning a document (e.g., form such as a quotation) with the MFP 110, converting the obtained scan image into a file, and saving it to the storage server 130. Note that the sequence chart in FIGS. 5A and 5B describes a case of setting a file name to be given to a scan image at the time of converting it into a file. However, the sequence chart is applicable to general properties such as folder path and metadata, besides file name.

The MFP 110 displays UI screen of a main menu (hereinafter referred to as "main screen") upon activation. By installing a dedicated application necessary for scanning a document, converting it into a file, and utilizing the cloud storage service into the MFP 110, a "Scan and save to cloud storage" button is displayed in the main screen. Then, when the user presses the "Scan and save to cloud storage" button among the menu buttons displayed in the main screen, the series of processes illustrated in the sequence chart in FIGS. 5A and 5B is started. The communication between the apparatuses will be described below in chronological order along the sequence chart in FIGS. 5A and 5B. Note that the symbols "S" in the following description represent steps.

In S501, the MFP 110 displays a UI screen for entering login authentication information for accessing the MFP cooperative server 120 (hereinafter referred to as "login screen") on the operation unit 220. The login screen contains a "Login" button, an ID entry field, and a password entry field.

In S502, when the user enters a preregistered user ID and password respectively into the ID entry field and the password entry field in the login screen and presses the "Login" button, a login authentication request is transmitted to the MFP cooperative server 120.

In S503, in response to receiving the login authentication request, the MFP cooperative server 120 performs an authentication process by using the user ID and password contained in the request. In a case where the user is confirmed as a genuine user by the authentication process, the MFP cooperative server 120 returns an access token to the MFP 110. In a case where various requests are subsequently issued from the MFP 110 to the MFP cooperative server 120, this access token is sent along with them so that the logged-in user can be identified. In the present embodiment, by completing login to the MFP cooperative server 120, login to the storage server 130 is also completed at the same time. Thus, the user links a user ID for utilizing the MFP cooperative service and a user ID for utilizing the storage service with each other via a web browser on a PC (not illustrated) or the like on the Internet in advance. In this way, if the authentication of login to the MFP cooperative server 120 succeeds, the authentication of login to the storage server 130 is also completed at the same time. This can omit an operation for logging in to the storage server 130. The MFP cooperative server 120 can handle requests related to the storage service from the user having logged in to the MFP cooperative server 120. Note that, as for the login authentication method, a generally and publicly known method (such as Basic authentication, Digest authentication, or authentication using OAuth) may be used to perform the login authentication.

In S504, after the login is completed, a UI screen for configuring the scan settings (hereinafter referred to as "scan setting screen") is displayed on the operation unit 220 of the MFP 110. The scan setting screen includes a "Start scan" button, a color setting field, and a resolution setting field. The "Start scan" button is a button for issuing an instruction to start a scan process on a document (assumed to be a form such as a quotation or an invoice in the present embodiment) set on the platen glass. In the color setting field, the color mode for scanning is set. The color mode can be designated from among choices such as full color and black-and-white, for example. In the resolution setting field, the resolution for scanning is set. The resolution can be designated from among choices such as 600 dpi and 1200 dpi, for example. Note that the color mode and the resolution are an example of setting items. Not all of them have to be present, and/or a setting item other than them may be present. Also, the choices for the color mode and the resolution may be limited only to setting values required by the storage service. The logged-in user sets specific conditions for the scan process via the scan setting screen as above.

In S505, when the logged-in user having finished configuring the scan settings sets a scan-target document on the platen glass of the MFP 110 and presses the "Start scan" button, a scan is executed. Consequently, scan image data as a computerized paper document is generated.

In S506, after the completion of the scan, the MFP 110 transmits the scan image data obtained by performing the scan to the MFP cooperative server 120 along with an analysis request being a request to analyze the scan image data.

In S507, at the MFP cooperative server 120 having received the analysis request for the scan image, the request control unit 431 instructs the image processing unit 432 to execute an image analysis process (S508 to S511). In doing so, the request control unit 431 returns a request ID ("processId") which can uniquely identify the received analysis request to the MFP 110.

After receiving the request, the MFP cooperative server 120 performs the image analysis process with the image processing unit 432.

In S508, the image processing unit 432, in response to receiving the instruction to execute the image analysis process, executes the image analysis process on the scan image associated with the analysis request. In this image analysis process, the image processing unit 432 firstly performs a process of detecting the character regions present in the scan image being the target of the image analysis process (hereinafter referred to as "target image") (character region detection process). For the character region detection, a known method (e.g., a block selection process or the like) may be employed such as a method in which rectangular regions assumed to be characters are extracted from an image binarized based on a threshold value, for example.

In S509, the image processing unit 432 performs a process of determining whether the image data of the paper document being the target of the image analysis process is similar to a previously computerized paper document image by matching the image data with learned data. For instance, a form such as a quotation is an example of the paper document being the target of the image analysis process. Incidentally, the process of determining whether the image data of the form being the target of the image analysis process is similar to a previously computerized form image by matching the image data with the learned data will hereinafter be referred to as "similar form determination process". This similar form determination process uses arrangement information being information indicating the position, in the target image, of each character region being a region present in the target image and containing a character string to be subjected to the later-described character recognition process (hereinafter referred to as "character region"). Specifically, the arrangement information on the target form image generated this time and the arrangement information on a previous form image accumulated in the learned data are compared with each other to determine whether or not their character region arrangements are the same or similar. This is based on the idea that forms can be assumed as forms of the same type created by using the same document format (form format) if their character region arrangements are the same or similar. Hereinafter, a form having the same document format as the document format of the document of the form image being the target of the similar form determination process will be referred to as "similar form". Moreover, the scan image obtained by scanning the similar form will be referred to as "similar form image". Furthermore, a state where the document of the target image and the similar form corresponding to the target image have the same document format may hereinafter be expressed simply as "similar" or the like. The arrangement information on previous form images to be used in this similar form determination process are accumulated as learned data. Note that in the present embodiment, whether the forms are similar or not is determined based solely on the degree of match between their character region arrangements. However, for example, the types of the forms (quotation, invoice, etc.) may be identified from the results of their character recognition processes and whether they are similar or not may be determined with the obtained type information taken into account.

In S510, the image processing unit 432 executes a character recognition process on each character region found by the character region detection process.

In S511, the image processing unit 432 executes a process of determining whether automatically transmit a document file of the present target image (hereinafter referred to as "automatic transmission determination process"). Details of the automatic transmission determination process will be described later by using FIG. 8.

In S512, while the above image analysis process is performed, the MFP 110 checks with the MFP cooperative server 120 about the status of the image analysis process regularly (e.g., at intervals of about several hundred milliseconds to several milliseconds) by using the above-mentioned request ID (S512 to S513). This check is repeatedly executed until a response containing information indicating completion of the image analysis process is obtained from the MFP cooperative server 120. In response to receiving a request to check the status of the image analysis process, the request control unit 431 of the MFP cooperative server 120 checks the progress of the image analysis process associated with the request ID. If the image analysis process has been completed, the request control unit 431 returns a completion response. A character string indicating the current process status appears in "status" in these responses. Specifically, "processing" appears in a case where the process is being performed at the MFP cooperative server 120 (in-progress response), whereas "completed" appears in a case where the process has been completed (completion response). Note that a character string indicating a different status may appear, such as "failed" in a case where the process has failed. Incidentally, the completion response also contains information such as a URL indicating a storage destination for the result of the image analysis process. Thereafter, in response to receiving a completion response for the above image analysis process, the MFP 110 transmits, to the MFP cooperative server 120, a request to obtain the result of the image analysis process by using the URL indicating the storage destination for the result of the image analysis process contained in the completion response. In response to receiving this request, the request control unit 431 of the MFP cooperative server 120 returns information containing the result of the image analysis process (result information) to the MFP 110. This result information contains the results of the character region determination process, the similar form determination process, the character recognition process, and the automatic transmission determination process on the target image.

If the result of the automatic transmission determination process is "automatic transmission is not allowed", processes of S515 to S519 to be described later are executed to urge the user to perform editing, correction, or the like. If, on the other hand, the result of the automatic transmission determination process is "automatic transmission is allowed", the processes S515 to S519 to be described later are not executed and the processing proceeds to S521, in which a document file of the target image is automatically generated, and the document file is then automatically transmitted to the storage server 130 (S522). In the case of automatically generating a document file, character strings obtained in the character recognition process are used as its file name.

If the result of the automatic transmission determination process is "automatic transmission is not allowed", then in S515, the MFP 110 displays a UI screen for the user to set and transmit a file name. Examples of this UI screen include a scanned form list screen (FIG. 6A) and an edit screen (FIG. 6B) to be described later.

In a case where the user issues an instruction to save a document file, then in S516, the cooperative service request unit 423 of the MFP 110 transmits a request to learn and save file name setting information to the MFP cooperative server 120. This request will hereinafter be referred to as "file name setting information save request". The file name setting information save request also includes a request to learn information on the type of the form (hereinafter referred to as "form learning"). The cooperative service request unit 423 of the MFP 110 also transmits a request to perform the similar form determination process again to the MFP cooperative server 120 together with the file name setting information save request. The request to perform the similar form determination process again will hereinafter be referred to as "similar form redetermination request". Here, the file name setting information without correction of fixed character strings contains information on the character strings displayed in a folder name entry field 614 and the like as the character strings with the highest degree of certainty obtained from the character recognition process. Further, the file name setting information in this case may contain information on the character regions of those character strings and information on the type of the form in which the character strings are written. Furthermore, the file name setting information with correction of fixed character strings further contains information on the character strings before and after the correction.

In S517, in a case of receiving the file name setting information save request from the MFP 110, the request control unit 431 of the MFP cooperative server 120 instructs the image processing unit 432 to save this file name setting information. The request control unit 431 of the MFP cooperative server 120 also instructs the image processing unit 432 to execute a similar form redetermination process in a case of receiving the similar form redetermination request from the MFP 110.

In S518, in response to receiving the above save instruction from the request control unit 431, the image processing unit 432 executes a process of saving the file name setting information (hereinafter referred to as "setting information save process"). In the setting information save process, information on the character regions in the entire scan image, and the character regions in the scan image used for the folder name and the like by the user and their character recognition result information are saved.

In S519, the image processing unit 432 performs the similar form determination process again on the target image if it has been determined that no similar form is present and its file name or the like has not been corrected. The similar form determination process performed again will hereinafter be referred to as "similar form redetermination process". On the other hand, if a similar form to the target image is present, its file name is automatically set based on the learned data. The image processing unit 432 then passes information containing status information indicating that the setting information save process and the similar form redetermination process have been completed, to the request control unit 431. Moreover, in response to obtaining the information containing the status information indicating that the setting information save process and the like have been completed from the image processing unit 432, the request control unit 431 transmits a response containing status information indicating this fact to the MFP 110.

In S520, in response to obtaining the response from the request control unit 431, the MFP 110 transmits a request to generate a file (hereinafter referred to as "file generation request") to the MFP cooperative server 120 based on the information contained in this response. In response to receiving the file generation request, the request control unit 431 of the MFP cooperative server 120 starts a file generation process and also returns a response containing information indicating that the file generation request has been properly received to the MFP 110. In response to receiving this response from the request control unit 431, the MFP 110 terminates the processing and displays the scan setting screen in S504 again.

In S521, the MFP cooperative server 120 obtains information on a file format from preregistered scan settings, and converts the target image into a file (generates a file of the target image) by following this file format.

In S522, the request control unit 431 transmits the generated file to the storage server 130. Moreover, in S522, in response to receiving the file transmitted from the MFP cooperative server 120, the storage server 130 returns a response indicating a status representing that the transmission of the file has been completed, to the MFP cooperative server 120.

The above is a general flow of processing in the entire image processing system. Note that the content of the sequence chart of FIGS. 5A and 5B is such that the MFP 110 communicates with the MFP cooperative server 120. However, the configuration may be such that the obtaining of the result of the image analysis process, the displaying of the UI screen, the issuing of the learning instruction, and the like may be done by the client PC (not illustrated) or the like.

Scanned Form List Screen

FIG. 6A is a diagram illustrating an example of the scanned form list screen. In this screen, a list of scan images of forms before being transmitted to the storage server 130 can be browsed.

Also, this screen includes a form list 601, a "Send" button 602, an "Edit" button 603, and a "Delete" button 604. The form list 601 is a region to display a list of forms which have completed the image analysis process but whose files have not yet been transmitted.

The form list 601 includes items of form ID 605, transmission destination 606, status 607, and file name 608. In the form ID 605, an identifier uniquely identifying a form is entered. In the transmission destination 606, information on the storage server 130 as a transmission destination is entered. In the status 607, the result of the similar form determination process performed is shown, and either "Unlearned" or "Leaned" is displayed. "Unlearned" indicates that there is no previous form image similar to the corresponding scan image. On the other hand, "Learned" indicates that there is a previous form image similar to the corresponding scan image. In the case where there is a similar previous form image, the file name set for this form image is entered in the file name 608. As a rule, in the case where the status 607 is "Unlearned", no file name has been set and therefore the file name 608 is blank.

The "Send" button 602 is a button for transmitting a document file containing a form image to the storage server 130. Selecting any form ID from the form list 601 and pressing the "Send" button 602 transmits a document file of the corresponding form image to the storage server 130 displayed in the transmission destination 606. In a case where the transmission is properly completed, the data associated with the form ID is deleted from the form list 601.

The "Edit" button 603 is a button for transitioning to an edit screen 610. Selecting any form ID from the form list 601 and pressing the "Edit" button 603 transitions to the edit screen 610 for the scan image associated with the selected form ID.

The "Delete" button 604 is a button for deleting the data associated with a selected form ID. Selecting any form ID from the form list 601 and pressing the "Delete" button 604 can delete the data associated with the selected form ID.

Edit Screen

FIG. 6B is a diagram illustrating an example of the edit screen. By pressing the "Edit" button 603 in the scanned form list screen 600, the screen transitions from the scanned form list screen 600 to the edit screen 610. This screen includes a scan image display region 611, a "Cancel" button 612, a "Finish Editing" button 613, the folder name entry field 614, a file name entry field 615, a "Date" entry button 616, and a "User ID" entry button 617.

In the scan image display region 611, a target scan image is displayed, and each character region with a background displayed in gray is displayed in a recognizable manner to the user. In this example, a character recognition process has been executed on predetermined character regions based on information on a previous form image determined to be similar. Specifically, the character recognition process has been executed on a character region 618 of "Quotation" and a character region 619 of "INV20200604" in the scan image. The sign "P2" at the upper left of the character region 618 indicates a character region in the previous form image in which was displayed a character string used as the second character string to set its folder name. The sign "F1" at the lower left of the character region 618 indicates a character region in the previous form image in which was displayed a character string used as the first character string to set its file name. The sign "F2" at the upper left of the character region 619 indicates a character region in the previous form image in which was displayed a character string used as the second character string to set its file name. Thus, these pieces of information on character regions correspond respectively to character regions in the target scan image subjected to the character recognition process. In, for example, the folder name entry field 614, the date on which the scan was performed (e.g., Jun. 4, 2020) has been automatically entered as the first character string. Moreover, the second character string "Quotation" is connected by a delimiter "_", so that "20200604_Quotation" has been pre-entered. Similarly, in the file name entry field 615 too, a character string indicating the type of the form has been entered as the first character string, and a character string indicating the management number of the form has been entered as the second character string. In this way, a file name candidate such as "Quotation_INV20201234" is pre-displayed in the file name entry field 615. If the user wishes to change a folder name thus automatically entered, the user presses the folder name entry field 614 and, for example, designates character regions in the scan image display region 611. Alternatively, the user may press the "Date" entry button 616 and the "User ID" entry button 617 to enter corresponding character strings. The character strings thus entered are connected by a delimiter "_". The user can also correct the file name as desired in a similar way. In a case where there is a character region that has not been subjected to the character recognition process, a request to perform the character recognition process may be issued to the MFP cooperative server 120 as appropriate to obtain a character recognition result.

In a case where the user presses the "Finish editing" button 613, the folder name and the file name are fixed, and the screen transitions to the scanned form list screen 600. In the form list 601 in the scanned form list screen 600 after the transition, the fixed content is reflected in the file name 608. In a case where the user presses the "Cancel" button 612, the screen returns to the scanned form list screen 600.

Example of Analysis Result

FIG. 7 is a diagram illustrating an example of a data structure indicating an analysis process result. "enabledAutoTransmission" stores a value ("true" or "false") based on the automatic transmission determination process in S511 indicating whether to allow transmission of the target image to the storage server 130 without checking with the user or learning. "confidence" stores the value of a confidence factor of each of the character strings automatically entered in the file name field and the like in the result of the character recognition process (overall confidence factor to be described later) (S510). This value is represented as a real number value from 0 to 1. A larger real number value represents a lower possibility for the result of the character recognition process (S510) to be incorrect and higher suitability for automatic transmission of the target image. By referring to this value, the image processing unit 432 determines whether to automatically transmit the target image to the storage server 130 or to display it in the scanned form list 601 to thereby urge learning and correction by the user. By referring to this value, the client PC (not illustrated) determines whether to automatically transmit the target image to the storage server 130. "matched" stores a value indicating whether a similar form being a scan image obtained by scanning a form of a type similar to the form of the target image has been found in S509. "formId" stores a value which, if a similar form is present, uniquely represents that form. If, on the other hand, there is no similar form, a new value is issued and this new value is stored. "matchingScore" stores a value which, if there is a similar form, indicates the degree of the similarity. "matchingScore" indicates the degree of match between the arrangement information on the previous scan image and the arrangement information on the present scan image with a real number value from 0 to 1. A larger real number value represents greater similarity between the present scan image and the previous scan image. "rectInfoArray" stores information indicating the character regions in the present analysis-target image corresponding to the character regions in the similar form previously used by the user to set its file name. Assume, for example, that an image has previously been obtained by a scan, its file name has been set using "Quotation" and "INV20201234", and the entered result has been learned. Thereafter, a new image is obtained by a scan and is determined as a similar form as a result of performing a similar form determination with the above scan image. In this case, the entered pieces of information are stored in "rectInfoArray" as pieces of information to be automatically entered. Firstly, in the entered result learning, from information saved in the HDD 314 of the MFP cooperative server 120, character regions partly overlapping with previously set coordinate information on the character regions of "Quotation" and "INV20201234" are identified. As a result, coordinate information on each partly overlapping character region and the corresponding characters are stored in later-described "text" in "rectInfoArray". "key" stores a value uniquely representing a character region to be used in the automatic entry. "score" stores a value representing a confidence factor as an index indicating the degree of certainty of the result of the character recognition process. The confidence factor is represented as a real number value from 0 to 1. A larger real number value means that the result of the character recognition process is more certain. "region" stores coordinate information on the character region and characters extracted by the character recognition thereof. "rect" indicates the coordinates of one of the extracted character regions. "x" represents the X coordinate of the upper left corner of the region, "y" represents the Y coordinate of the upper left corner of the region, "width" represents the number of pixels of the region in the X direction, and "height" represents the number of pixels of the region in the Y direction. "text" indicates the characters extracted by character recognition done by performing the character recognition process on the character region in "rect". "metadataArray" stores information indicating the order of the character regions to be used for the file name and the position of a delimiter to be inserted for automatic entry of the file name. Also, in a case where information containing other properties than the file name such as metadata are set, necessary information is added to "rectInfoArray" and "metadataArray". "key" stores a value uniquely indicating a setting value to be set for the scanned document. "keyType" stores a value indicating the type of the setting value in "key". In a case of using them for the file name, "key" is "filename" and "keyType" is "filename". "value" stores information on the character region to be used for the value of "key" and a delimiter. In the example of FIG. 7, the file name is automatically entered by using the region with "key" holding "textRegion0" in "rectInfoArray", a delimiter, and the region with "key" holding "textRegion1" in "rectInfoArray" in this order.

A system configuration and flow in the present invention have been described so far. In the following, of the processes in the image analysis process performed by the image processing unit 432 of the MFP cooperative server 120, the automatic transmission determination process, which is important in the present embodiment, will be described.

Automatic Transmission Determination Process

Before starting the description of a flow of the automatic transmission determination process according to the present embodiment, prerequisite technical matters will be mentioned. For a system that automatically transmits document files to a storage, an "automatic transmission ratio" and an "incorrect transmission ratio" are important. The "automatic transmission ratio" is a concept representing the ratio of automatic transmission target document files that can be automatically transmitted without incorrect character strings being set in their file names or folder names. The "incorrect transmission ratio", on the other hand, is a concept representing the ratio of automatic transmission target document files that are automatically transmitted with incorrect character strings being set in their file names or folder names. Here, the automatic transmission ratio is defined by Equation (1) below.

"Automatic Transmission Ratio=Number of Automatic Transmission Jobs/Number of All Filing Jobs"  Equation (1)

In Equation (1) above, the number of automatic transmission jobs is the number of document files whose form images have a confidence factor above a predetermined threshold value and for which the automatic transmission process has been performed. The number of all filing jobs is the number of all document files for which a filing process has been performed. Moreover, it is the sum of the document files edited and corrected by the user and the files automatically transmitted.

On the other hand, the incorrect transmission ratio is defined by Equation (2) below.

"Incorrect Transmission Ratio=Number of Incorrect Transmission Jobs/Number of Automatic Transmission Jobs"  Equation (2)

To improve user convenience, the automatic transmission ratio should be high and the incorrect transmission ratio should be low. The user sets a target incorrect transmission ratio in advance according to the extent to which the user wishes to reduce incorrect transmission. Examples of the method of setting the incorrect transmission ratio include a method in which the incorrect transmission ratio is set by operating a slide bar in a predetermined UI screen. In the present embodiment, it is determined that automatic transmission is allowed in a case where the confidence factor of the form image as a whole is above a predetermined threshold value.

Figure 8:
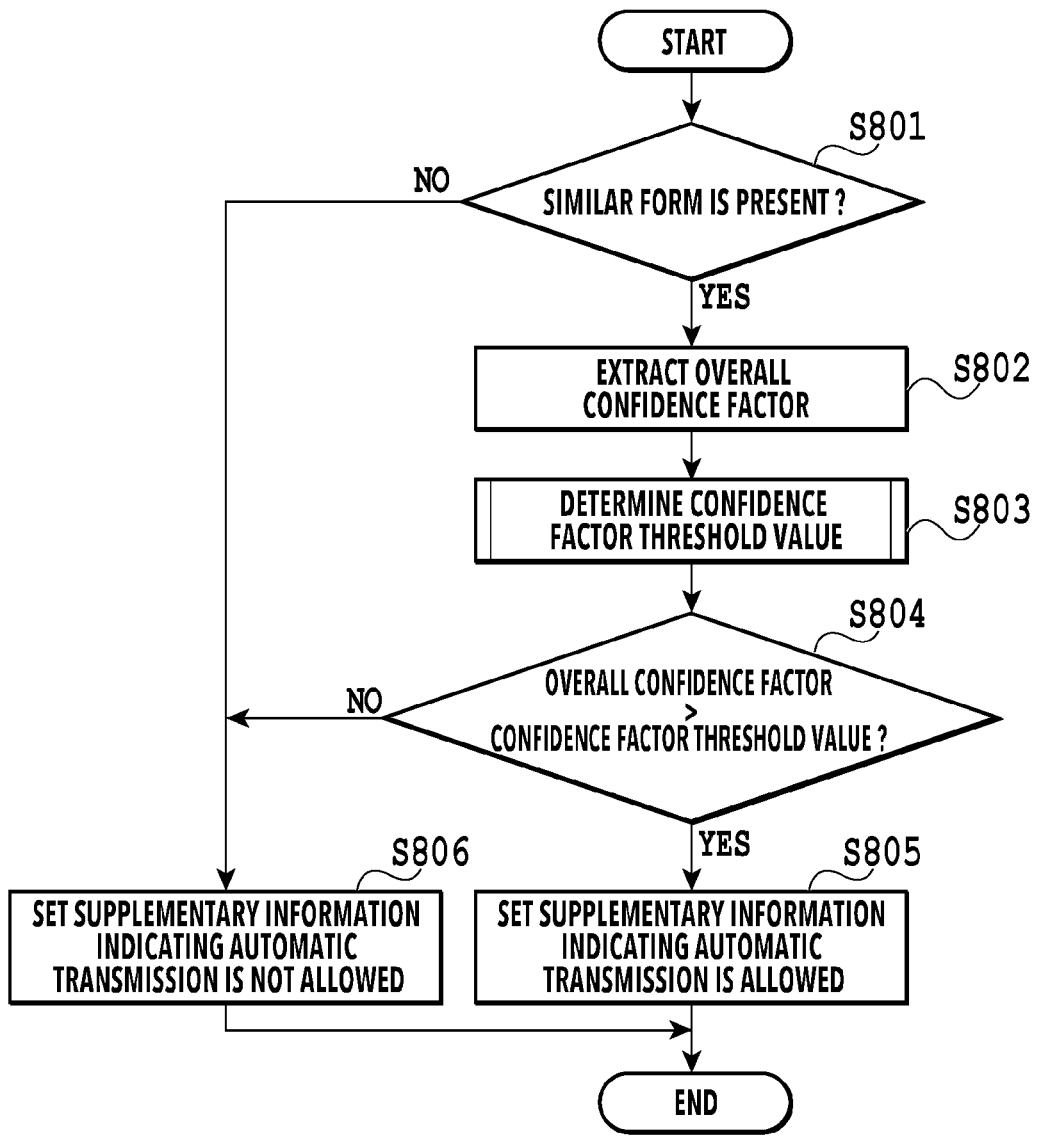
FIG. 8 is a flowchart illustrating details of an automatic transmission determination to be performed by the image processing unit in the system.

FIG. 8 is a flowchart illustrating a flow of the automatic transmission determination process. In the processing of this flowchart, program code stored in the ROM 312 or the HDD 314, which is a storage unit included in the MFP cooperative server 120, is loaded into the RAM 313 and executed by the CPU 311. The automatic transmission determination process assumes that information on the character strings used in the file names of document files already saved in a storage has been held in the HDD 314 of the MFP cooperative server 120 by the setting information save process (S518).

In S801, the image processing unit 432 branches the processing based on the result of the similar form determination process (S509). The processing proceeds to S802 if a form image similar to the target image has been found, and proceeds to S806 if no similar form image has been found.

In S802, based on the confidence factor of each of the character strings automatically entered in the file name field and the like in the result of the character recognition process (S510), the image processing unit 432 extracts the confidence factor of the target image as a whole (hereinafter referred to as "overall confidence factor"). First, the confidence factor of each character string will be mentioned. In the character recognition process, dictionary data in which feature amounts (patterns) of various characters are pre-registered is used to find characters in the dictionary data whose feature amounts match those of the input characters to thereby recognize particular characters. Thus, the higher the rate of match in feature amount, the more likely the character recognition result is right (the more likely the identified characters are correct). Moreover, the more fainted or crushed the characters are, the lower this rate of match tends to be. Thus, the rate of match in feature amount in the character recognition result is derived, and this is determined as the confidence factor of each character string. Moreover, in this step, the overall confidence factor, which is the confidence factor of the target image as a whole, is derived by a method such as calculating, for example, an average value of the confidence factors of the character strings used in the file name and the like of the target image. Note that the overall confidence factor may be derived with other pieces of information further taken into consideration. Examples of such include information on the similar form image, information on character regions, and information on the character recognition result. Each of these will be described below.

Information on Similar Form Image

The information on the similar form image is information indicating whether the target image is actually identical to the form image determined to be similar, and is assumed to be a similarity score or information indicating whether a form image with a certain similarity score or higher is present. Other examples include the accumulated number of times the above form image has been determined to be similar, the most recent date and time when the form image was determined to be similar, the history of correction of the file name and the like by the user, and so on.

Information on Character Regions

The information on character regions is information on the character regions corresponding to each other between the target image and the similar form image and used for the file name and the like. Specifically, it is assumed to be information on the difference in the result of holistic positioning and the difference in the result of local positioning, information on the difference in character region height, information on the difference in character region width, and information on whether a similar character region is present around. It is also possible to use history information on these pieces of information on the similar form image and the like.

Information on Character Recognition Result

The information on the character recognition result is information on the character strings corresponding to each other between the target image and the similar form image and used for the file name and the like. Specific examples are assumed to be information on a reliability score of the character recognition process of each character, information on reliability scores of next and subsequent candidate characters in the character recognition result of each character, and information on reliability scores of each character string taking context information into consideration. Other examples are assumed to be information on a character string format estimated from the character recognition results of a group of previous form images determined to be similar to the similar form image, and information on the tendency of an incorrect character recognition result. The character string format is assumed to be information on whether the corresponding character region always have the same character string or a different character string, whether the character string width is fixed or variable, whether the character string includes a number(s), and so on. The tendency of an incorrect character recognition result is assumed to be information on the tendency of an incorrect result due to the character recognition module, information on the tendency of an incorrect result by each user, and so on.

In the present embodiment, the overall confidence factor derived as described above is normalized in a range of 0 to 1, where 1 represents the highest degree of certainty. Note that the method of deriving the overall confidence factor may be such that, for example, the above pieces of information are converted into feature amounts as input data, correct/incorrect data with respect to sample data is prepared and machine learning is performed with it, and a discriminator (learned model) thus generated is used to derive the overall confidence factor. Here, the sample data is form images created or collected by a developer on the assumption of user's use cases and is data to which a flag (correct/incorrect data) indicating whether automatic transmission is allowed and the like are attached. A publicly known method capable of binary classification, such as a neural network or a support vector machine (SVM), may be used as the method of the machine learning, and the output result may be normalized in a range of 0 to 1. Alternatively, individual rules may be created and combined. The individual rules may be generated using machine learning, or manually created based on sample data (data created or collected by a developer on the assumption of user's use cases).

The description now returns to the flow in FIG. 8.

In S803, the image processing unit 432 determines a threshold value to be used to determine whether to perform automatic transmission (hereinafter referred to as "confidence factor threshold value") based on the overall confidence factor derived as described above. A default confidence factor threshold value is set at the point immediately after the start of this flow. Here, if the default confidence factor threshold value is lowered in order to raise the automatic transmission ratio, the incorrect transmission ratio rises. It is generally required to improve the automatic transmission ratio by lowering the confidence factor threshold value within such a range that the incorrect transmission ratio can be held at a predetermined ratio or lower. The default confidence factor threshold value is determined with such a point taken into consideration. Note that details of a confidence factor threshold value setting process will be described later using FIG. 9.

In S804, the image processing unit 432 determines whether to automatically transmit the document file of the target image based on the overall confidence factor extracted in S802 and the confidence factor threshold value determined in S803. Specifically, if the overall confidence factor is above the confidence factor threshold value, the processing proceeds to S805. If, on the other hand, the overall confidence factor is not above the confidence factor threshold value, the processing proceeds to S806. For instance, in the example of FIG. 7 described earlier, the overall confidence factor extracted in S802 is "0.9". Moreover, the confidence factor threshold value determined in S803 is "0.767". Thus, in this instance, the overall confidence factor is above the confidence factor threshold value, so that the processing proceeds to S805.

In S805, the image processing unit 432 sets supplementary information indicating that "automatic transmission is allowed" for the target image. Possible examples of this supplementary information include a flag indicating that automatic transmission is allowed with a binary value (e.g., gives "1" in a case where "automatic transmission is allowed" and "0" in a case where "automatic transmission is not allowed"), and the like. In the case where "automatic transmission is allowed" as above, the display on whether or not to allow automatic transmission becomes ""enabledAutoTransmission": true" (see FIG. 7).

In S806, the image processing unit 432 sets supplementary information indicating that "automatic transmission is not allowed" for the target image and, for example, sets the above flag.

The above is the content of the automatic transmission determination process. Note that even if the overall confidence factor is above the confidence factor threshold value in the process of S804 described above, the processing may proceed to S806 in a case of referring to information on the previously performed similar form determination processes and finding that the number of form images determined to be similar to the form of the target image is a predetermined number or less. Moreover, information on those form images determined to be similar may be obtained.

Confidence Factor Threshold Value Setting Process

Figure 9:
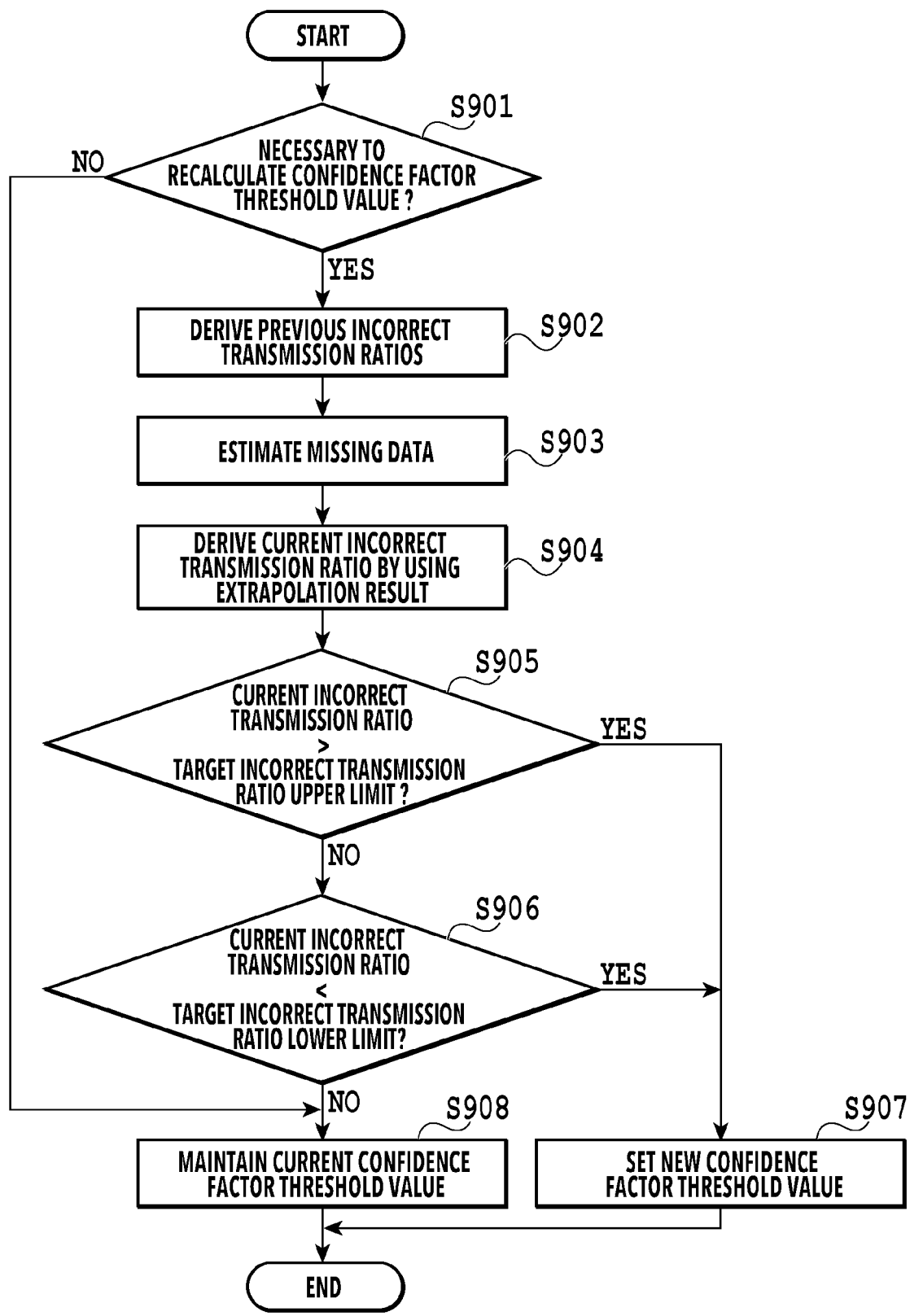
FIG. 9 is a flowchart illustrating details of confidence factor threshold value setting to be performed by the image processing unit in the system.

Next, the confidence factor threshold value setting process (S803) will be specifically described. FIG. 9 is a flowchart illustrating a flow of the confidence factor threshold value setting process.

In S901, it is determined whether a certain condition requiring recalculation of the confidence factor threshold value has been met. Recalculation of the confidence factor threshold value is determined to be necessary in a case where, for example, a predetermined period (e.g., one month) has elapsed since the last recalculation or the setting information save process (S518) has been executed a predetermined number of times (e.g., 10 times) after the last recalculation. If recalculation of the confidence factor threshold value is determined to be necessary, the processing proceeds to S902. If, on the other hand, recalculation of the confidence factor threshold value is determined to be not necessary, the processing proceeds to S908.

In S902, the previous incorrect transmission ratios are derived based on the form learning result saved in a previous setting information save process and the overall confidence factor derived in S802. Specifically, firstly, a process is performed which involves estimating that there was an error in the result of the character recognition process on the previous form image in a case where the user corrected its file name and/or the like, and estimating that there was no error in a case where the user made no correction. Then, correct/incorrect information is obtained in which are organized cases where an error is estimated to have been present (denoted as "incorrect") and cases where no error is estimated to have been present (denoted as "correct"). Then, the previous incorrect transmission ratio is derived. Here, how the previous incorrect transmission ratio is derived will be described with reference to FIG. 10A. Now, in a table 1000 in FIG. 10A, correct/incorrect information obtained for each of overall confidence factors at intervals of 0.1 is shown in the third and fourth columns. The intervals of collection of the correct/incorrect information is not limited to 0.1, and may be changed as appropriate according to the number of scan images.

In the table 1000 in FIG. 10A, a value A in the first column and a value B in the second column represent a range of the overall confidence factor. Moreover, correct/incorrect information on target images having an overall confidence factor meeting a condition "value A≤overall confidence factor<value B" is collected for each row at intervals of 0.1. The third column in the table 1000 in FIG. 10A indicates the number of previous form images estimated to be "correct", and the fourth column indicates the number of previous form images estimated to be "incorrect". Moreover, the fifth column indicates the number of previous form images automatically transmitted, and the sixth column is the total number of previous form images estimated to be "incorrect" and previous form images estimated to be "correct". In this case, the numbers of images in particular columns (e.g., third to sixth columns) may be weighted such that more recent data affects the estimation more greatly. For example, the most recent form image is weighted to be counted as one image, and the weight is set smaller for older form images, and old form images before a certain time point are not counted. The seventh column indicates an "in-range incorrect transmission ratio" represented by Equation (3) below.

"In-Range Incorrect Transmission Ratio=Number of "Incorrect" in Fourth Column/Number of Scan Images in Sixth Column"  Equation (3)

Here, in the example of FIG. 10A, there is no data from the eighth column ("No Data" region). This is because the confidence factor threshold value is set at "0.7" and means that scan images for which the overall confidence factor is above 0.7 were automatically transmitted. Accordingly, in the region where the overall confidence factor is above "0.7", correct/incorrect information is not present, and the in-range incorrect transmission ratio is not calculated either.

In S903, the missing data in the previous incorrect transmission ratios derived in S902 is estimated. The estimation in this step can be rephrased as a process of estimating the ratio of cases where there is an error in the result of the character recognition process which is presented as a character string forming a property of a scan image which was not automatically transmitted in the past. For this estimation, a publicly known extrapolation method may be used, and a model with a high degree of match with sample data may be used. In a case where one wishes to perform a conservative estimation (in a case where reduction of incorrect transmission is focused on), the incorrect transmission ratio is set high at the time of model fitting. For this, penalty terms for model fitting errors may be set such that a heavier weight is given to a penalty for offset in the direction in which the incorrect transmission ratio becomes lower and a lighter weight is given to a penalty for offset in the direction in which the incorrect transmission ratio becomes higher. Also, for each range with a small number of previous form images, the extrapolated or interpolated value may be used as the incorrect transmission ratio of that range. One example of the extrapolation is illustrated in FIG. 10B. In a table 1100 in FIG. 10B, a value A in the first column and a value B in the second column are the same as those in the first and second columns in the table 1000 in FIG. 10A. The representative threshold value in the third column is a value calculated from Equation (4) below.

"(A+B)/2"  Equation (4)

In the present embodiment, the median of the range from A to B is handled as the representative threshold value for use in the calculation of the extrapolated value. The actually measured value in the fourth column in the table 1100 in FIG. 10B is the same value as that in the seventh column in the table 1000 in FIG. 10A. The extrapolated value in the fifth column is a value in the data missing region derived by extrapolation using the representative threshold value in the third column and the actually measured value in the fourth column. In this example, the extrapolated value is derived by exponential approximation.

A graph 1200 in FIG. 10C is a graph plotting the representative threshold value in the third column and the actually measured value in the fourth column in the table 1100 in FIG. 10B. The solid line in this graph represents the result of plotting the actually measured value, and the dotted line represents the result of the exponential approximation. In the graph 1200 in FIG. 10C, the dotted line and the solid line are not greatly dissociated, indicating that an appropriate extrapolation is achieved.

In S904, the current incorrect transmission ratio is derived using the extrapolated result obtained in S904. Since the in-range incorrect transmission ratio in each confidence factor range has been estimated by S903, the current incorrect transmission ratio is derived using this in-range incorrect transmission ratio. FIG. 10D illustrates a specific example of the current incorrect transmission ratio thus derived.

In a table 1300 in FIG. 10D, a value A in the first column and a value B in the second column are the same as those in the first and second columns in the table 1000 in FIG. 10A. The number of scan images in the third column is the same as that in the sixth column in the table 1000 in FIG. 10A. The in-range incorrect transmission ratio in the fourth column is the result of merging the actually measured value in the fifth column and the extrapolated value in the sixth column in the table 1100 in FIG. 10B. The number of incorrectly transmitted scan images in the fifth column is the result of multiplying the number of scan images in the corresponding row by the in-range incorrect transmission ratio in the row, and the numbers in the region where the overall confidence factor is greater than "0.7" are estimated values. The value of the sixth column "Number of Incorrectly Transmitted Scan Images with Value A and Above" in each row is the sum of the number of incorrectly transmitted scan images in the fifth column in the same row and the row immediately below it. This corresponds to the number of incorrectly transmitted scan images assumed in a case where the confidence factor threshold value in each row is the value A. In this example, the incorrect transmission ratio in a case where the confidence factor threshold value is "0.7" is the incorrect transmission ratio with the value A in the eighth column of the row where the value A in the first column is "0.7", i.e., 0.50%. With such a method, it is possible to estimate an incorrect transmission ratio for each range including ranges represented as "No Data" due to automatic transmission of the document files, and estimate the current incorrect transmission ratio for all ranges.

In S905, it is determined whether the current incorrect transmission ratio estimated in S904 is above a target incorrect transmission ratio upper limit. As a rule, as the confidence factor threshold value gets closer to 1, the incorrect transmission ratio drops but the number of document files to be automatically transmitted decreases and therefore the automatic transmission ratio drops. On the other hand, as the confidence factor threshold value gets closer to 0, the number of document files to be automatically transmitted increases and therefore the automatic transmission ratio rises but the incorrect transmission ratio rises. With these taken into account, the user sets a target incorrect transmission ratio in advance. Here, it is assumed that the target incorrect transmission ratio has an upper limit and a lower limit and therefore has a range. This is to prevent variation in confidence factor threshold value, which would otherwise make the system's behavior unstable. However, instead of setting the target incorrect transmission ratio's upper limit and lower limit, a confidence factor threshold value that serves as a target incorrect transmission ratio may constantly be calculated and updated. If the estimated incorrect transmission ratio is above the upper limit of the target incorrect transmission ratio, the processing proceeds to S907. If, on the other hand, the estimated incorrect transmission ratio is not above the upper limit of the target incorrect transmission ratio, the processing proceeds to S906.

In S906, it is determined whether the current incorrect transmission ratio estimated in S904 is below the lower limit of target incorrect transmission ratio. If the estimated incorrect transmission ratio is below the lower limit of the target incorrect transmission ratio, the processing proceeds to S907. If, on the other hand, the estimated incorrect transmission ratio is not below the lower limit of the target incorrect transmission ratio, the processing proceeds to S908.

In S907, a new confidence factor threshold value is calculated and set with which the target incorrect transmission ratio can be achieved. Prior to the calculation of the new confidence factor threshold value, the incorrect transmission ratio is calculated for each range by a similar method to S904. Then, a group of threshold values with an overall confidence factor close to the target incorrect transmission ratio is derived, an interpolation computation is performed, and a new confidence factor threshold value to be the target incorrect transmission ratio is set. The interpolation computation may be performed by a publicly known method such as a linear computation. Note that in the case where an upper limit and a lower limit are set for the target incorrect transmission ratio, the new confidence factor threshold value is calculated such that the incorrect transmission ratio falls within the range between these upper and lower limits of the target incorrect transmission ratio. For example, a confidence factor threshold value with which the incorrect transmission ratio can be the upper limit value of the target incorrect transmission ratio may be calculated, or a confidence factor threshold value with which the incorrect transmission ratio can be the median between of the upper and lower limits of the target incorrect transmission ratio may be calculated. Also, if for example, the current incorrect transmission ratio is above the target incorrect transmission ratio (YES in S905), a confidence factor threshold value with which the incorrect transmission ratio can be the upper limit value of the target incorrect transmission ratio may be calculated. If the current incorrect transmission ratio is below the lower limit of the target incorrect transmission ratio (YES in S906), a confidence factor threshold value with which the incorrect transmission ratio can be the lower limit value of the target incorrect transmission ratio may be calculated. In either case, a newly calculated and set confidence factor threshold value enables the incorrect transmission ratio to reach the target incorrect transmission ratio (fall within the range between the upper and lower limits of the target incorrect transmission ratio).

In S908, the current confidence factor threshold value is maintained.

The above is the content of the confidence factor threshold value setting process. Here, the processing from S901 in the case of setting a new confidence factor threshold value will be described using a specific example. This example also assumes that "0.7 to 0.8" has been set as the default value of the confidence factor threshold value for automatic transmission of a document file of "Quotation".

Suppose, for example, that a condition for preforming recalculation is the elapse of two weeks or longer from the last recalculation of the confidence factor threshold value, and one month has elapsed. In this case, it is determined that recalculation of the confidence factor threshold value is necessary (YES in S901).

Then, the previous incorrect transmission ratios are derived. Firstly, an in-range incorrect transmission ratio is calculated like "1÷21×100=95.238 . . . " with overall confidence factors "0 to 0.1", "0.1 to 0.2", "0.2 to 0.3", . . . (see FIG. 10A). Thereafter, for confidence factors of "0.7" and higher, for which data with actually measured values are not present, extrapolation is performed (S904) by performing extrapolation on the in-range incorrect transmission ratios thus calculated (95.24%, 50.00%, 23.08%, etc.). As a result, the in-range incorrect transmission ratios (0.94%, 0.49%, 0.26%, etc.) for the confidence factors of "0.7" and higher, for which data with actually measured values are not present, are calculated (see FIG. 10B).

Then, the current incorrect transmission ratio is derived using the extrapolation result. Specifically, the incorrect transmission ratio in the case where the confidence factor is "0.7" to "0.8" is derived (S905). In this example, the incorrect transmission ratio is "0.50%"(see FIG. 10D).

It is then determined whether the derived current incorrect transmission ratio (0.50%) is above the upper limit of the target incorrect transmission ratio set as appropriate by the user (S906). Assume now that 0.4% is set as the upper limit of the incorrect transmission ratio. In this example, the current incorrect transmission ratio is above the upper limit of the target incorrect transmission ratio, so that the processing proceeds to S908.

Thereafter, a new confidence factor threshold value is calculated by linear interpolation using the upper limit of the target incorrect transmission ratio (0.4% in this example), the incorrect transmission ratio of 0.5% in the case where the confidence factor threshold value is "0.7", and the incorrect transmission ratio of 0.35% in the case where the confidence factor threshold value is 0.8 (see FIG. 10D). Specifically, 0.7+(0.5−0.4)/(0.5−0.35)×(0.8−0.7)≈0.767 is obtained (with this calculation, it is possible to derive a confidence factor threshold value with which the incorrect transmission ratio is assumed to be 0.4). The value "0.767" thus obtained is set as a new confidence factor threshold value (S908).

MODIFICATION EXAMPLE

In the above embodiment, a new confidence factor threshold value is calculated and set by referring to all previous form images. The previous form images to be referred to may be limited to certain form images. For example, they may be limited to form images similar to the target image (i.e., previous form images with the same document format). This limitation may be enabled on condition that a predetermined number of form images similar to the target image (e.g., 100 images) or more are accumulated. In this way, the accuracy of calculation of the confidence factor threshold value is further improved. Moreover, in the case of making it a condition that the predetermined number of similar form images or more are accumulated, only a certain proportion of them (e.g., half) may be referred to.

Also, the range of similar previous form images in the present modification example can be changed as appropriate. For example, the range of similar form images is defined based on characteristics of character regions. Specific examples of the characteristics of the character regions are listed below.

Fixed-Character-String Fixed-Width Region

A fixed-character-string fixed-width region refers to a character region that always contains the same character string and always has the same width. Here, "fixed-character-string" means that a character string contained in a predetermined character region is always the same character string. Also, "fixed-width region" means that a character string contained in that character region always contains the same number of characters and always has the same width.

Multiple-Character-String-Candidate Variable-Width Region

A multiple-character-string-candidate variable-width region refers to a character region for which a plurality of character string candidates are available as character strings that can be contained in the character region and whose width is variable. Here, "multiple-character-string-candidate" means that there are a plurality of candidates as character strings having a possibility of being contained in the character region. "Variable-width region" means that the width of the character region has a possibility of being changed.

Variable-Character-String Fixed-Width Region (With No Number)

A variable-character-string fixed-width region (with no number) refers to a character region in which a variable character string is contained with no number, and whose width is always the same. Here, "variable-character-string" means that the character string contained the character region is variable. Also, "with no number" means that the characters forming the character string contained in the character region are characters other than numbers.

Variable-Character-String Fixed-Width Region (With a Number(s))

"Variable-character-string fixed-width region (with a number(s)) refers to a character region in which a variable character string is contained possibly with a number(s), and whose width is always the same.

Variable-Character-String Variable-Width Region (With No Number)

"Variable-character-string variable-width region (with no number) refers to a character region in which a variable character string is contained with no number, and whose width is variable.

Variable-Character-String Variable-Width Region (With a Number(s))

"Variable-character-string variable-width region (with no number) refers to a character region in which a variable character string is contained possibly with a number(s), and whose width is variable.

Note that information on the characteristics of the above character regions may be obtained in the confidence factor calculation step (S802).

As described above, according to the present embodiment, it is possible to flexibly set an appropriate degree of reliability of a confidence factor to be used to determine whether to allow automatic transmission of a document file.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to flexibly set an appropriate degree of reliability of a confidence factor to be used to determine whether to allow automatic transmission of a document file.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-214215, filed Dec. 23, 2020 which are hereby incorporated by reference wherein in its entirety.

What is claimed is:

1. An image processing apparatus comprising:
at least one memory that stores a program; and
at least one processor that executes the program to perform:
referencing a correlation between values on certainty of a result of a character recognition process performed for a scanned image and ratios of automatically transmitted document files with at least one incorrect property to automatically transmitted document files;
identifying a value on the certainty corresponding, in the referenced correlation, to a specified ratio;
determining, based on the identified value, a threshold value; and
transmitting automatically, based on comparison between the threshold value and a value on certainty of a result of a character recognition process performed for a scanned image obtained by scanning a document, a document file including the scanned image,
wherein at least one property of the document file is set based on the result of the character recognition process performed for the scanned image.

2. The image processing apparatus according to claim 1, wherein
the ratios are calculated based on first ratios and second ratios;
the first ratios are actual ratios of manually transmitted document files with at least one modified property to manually transmitted document files in the past, the first ratios corresponding respectively to different values on the certainty; and
the second ratios are estimated ratios of automatically transmitted document files with at least one incorrect property to automatically transmitted document files in the past, the second ratios are estimated by an extrapolation using the first ratios.

3. The image processing apparatus according to claim 2, wherein in calculating the first ratios, newer document files among the manually transmitted document files are more weighted so that the newer document files affect the calculated first ratios more greatly.

4. The image processing apparatus according to claim 2, wherein in the estimating, the estimation is performed by extrapolation.

5. The image processing apparatus according to claim 2, wherein in the determining, the predetermined threshold value is determined by linear interpolation.

6. The image processing apparatus according to claim 2, wherein first scanned images included in the manually transmitted document files in the past and second scanned images included in the automatically transmitted document files in the past are similar in a format of a scanned document.

7. The image processing apparatus according to claim 2, wherein the threshold value is determined in a case where the number of document files used for calculating the ratios reaches a predetermined number or more.

8. The image processing apparatus according to claim 1, wherein a new threshold value is determined in a case where a predetermined period has elapsed since the threshold value is determined.

9. The image processing apparatus according to claim 1, wherein one of the at least one property is a file name of the document file.

10. The image processing apparatus according to claim 1, wherein one of the at least one property is a name of a folder in which the document file is saved after being transmitted.

11. The image processing apparatus according to claim 1, wherein the specified ratio is specified by a user.

12. The image processing apparatus according to claim 1, wherein the specified ratio is specified in a range between the upper limit ratio and the lower limit ratio set by a user.

13. The image processing apparatus according to claim 1, the threshold value is determined by a linear interpolation for the table.

14. The image processing apparatus according to claim 1, wherein the processor executes the program to further perform transmitting the document file to an external apparatus.

15. An image processing system comprising:
the image processing apparatus according to claim 14; and
a server apparatus including a reception unit that receives the document file transmitted by the transmitting.

16. A control method of an image processing apparatus:
referencing a correlation between values on certainty of a result of a character recognition process performed for a scanned image and ratios of automatically transmitted document files with at least one incorrect property to automatically transmitted document files;
identifying a value on the certainty corresponding, in the referenced correlation, to a specified ratio;
determining, based on the identified value, a threshold value; and
transmitting automatically, based on comparison between the threshold value and a value on certainty of a result of a character recognition process performed for a scanned image obtained by scanning a document, a document file including the scanned image,
wherein at least one property of the document file is set based on the result of the character recognition process performed for the scanned image.

17. A non-transitory computer readable storage medium storing a program that executes a control method to function as an image processing apparatus, the control method comprising:
referencing a correlation between values on certainty of a result of a character recognition process performed for a scanned image and ratios of automatically transmitted document files with at least one incorrect property to automatically transmitted document files;
identifying a value on the certainty corresponding, in the referenced correlation, to a specified ratio;
determining, based on the identified value, a threshold value; and
transmitting automatically, based on comparison between the threshold value and a value on certainty of a result of a character recognition process performed for a scanned image obtained by scanning a document, a document file including the scanned image,
wherein at least one property of the document file is set based on the result of the character recognition process performed for the scanned image.

* * * * *